(12) United States Patent
Nyhus

(10) Patent No.: US 8,141,912 B2
(45) Date of Patent: Mar. 27, 2012

(54) FLEXIBLE DUCTING SYSTEM INCLUDING AN ARTICULABLE SEALED JOINT

(75) Inventor: Daniel A. Nyhus, Payson, AZ (US)

(73) Assignee: The Boeing Company, Chicago, IL (US)

( * ) Notice: Subject to any disclaimer, the term of this patent is extended or adjusted under 35 U.S.C. 154(b) by 229 days.

(21) Appl. No.: 12/546,781

(22) Filed: Aug. 25, 2009

(65) Prior Publication Data
US 2009/0309354 A1    Dec. 17, 2009

Related U.S. Application Data

(62) Division of application No. 11/434,676, filed on May 16, 2006, now Pat. No. 7,600,711.

(51) Int. Cl.
*F16L 27/10* (2006.01)
*F16L 23/00* (2006.01)
*F16L 41/00* (2006.01)

(52) U.S. Cl. ................ 285/223; 403/335; 137/561 A

(58) Field of Classification Search ............ 137/561 A, 137/872–876; 285/223–225, 298, 302, 261, 285/264, 265, 268, 269; 244/6, 7 A, 8, 17.11; 403/335
See application file for complete search history.

(56) References Cited

U.S. PATENT DOCUMENTS

| | | | | |
|---|---|---|---|---|
| 1,133,660 A * | 3/1915 | Papin et al. | ........... | 244/17.17 |
| 1,180,817 A * | 4/1916 | Ballard | ........... | 169/22 |
| 2,454,040 A * | 11/1948 | Dalton | ........... | 416/20 R |
| 2,586,144 A * | 2/1952 | Benoit | ........... | 406/154 |
| 2,688,501 A * | 9/1954 | Macleod | ........... | 285/145.1 |
| 2,941,749 A * | 6/1960 | Sullivan et al. | ........... | 244/6 |
| 3,159,360 A * | 12/1964 | Ryan et al. | ........... | 244/7 A |
| 3,296,361 A * | 1/1967 | Markland et al. | ........... | 174/86 |
| 3,327,969 A * | 6/1967 | Head | ........... | 244/7 R |
| 3,505,816 A * | 4/1970 | Wilde | ........... | 60/226.1 |
| 3,592,221 A * | 7/1971 | Worley et al. | ........... | 137/375 |
| 3,628,096 A * | 12/1971 | Drew et al. | ........... | 361/664 |
| 3,792,827 A * | 2/1974 | Girard | ........... | 244/7 A |
| 3,794,273 A * | 2/1974 | Girard | ........... | 244/7 A |
| 3,830,588 A * | 8/1974 | Nagler | ........... | 416/20 R |
| 3,843,282 A * | 10/1974 | Nagler | ........... | 416/20 R |
| 3,986,686 A * | 10/1976 | Girard | ........... | 244/7 A |
| 4,054,306 A * | 10/1977 | Sadoff et al. | ........... | 285/233 |
| 4,371,314 A * | 2/1983 | Dauel et al. | ........... | 416/20 A |
| 4,448,449 A * | 5/1984 | Halling et al. | ........... | 285/263 |
| 4,473,335 A * | 9/1984 | Henry | ........... | 416/20 A |

(Continued)

FOREIGN PATENT DOCUMENTS

DE    3603498 A1 *   8/1987

(Continued)

*Primary Examiner* — Tien Dinh
*Assistant Examiner* — Joseph W Sanderson

(57) ABSTRACT

Aircraft including a powerplant mounted on an airframe and a rotor/wing rotatably mounted on the airframe. The rotor/wing has multiple blades extending outward from roots adjacent the airframe to tips opposite the roots and having internal conduits extending between inlets adjacent the roots and downstream outlets. The aircraft also includes multiple intermediate ducts having upstream ends including flanges and downstream ends slidably and pivotally connected to corresponding blade inlets. Moreover, the aircraft includes a manifold having an upstream end in fluid communication with the powerplant and multiple downstream ends including flanges connected to upstream ends of corresponding intermediate ducts. The aircraft further includes multiple covers connected to corresponding manifold flanges and covering corresponding intermediate duct flanges. The aircraft also includes multiple absorbers positioned between corresponding intermediate duct flanges and manifold flanges and between the intermediate duct flanges and corresponding cover to control movement of the intermediate duct flanges.

11 Claims, 6 Drawing Sheets

U.S. PATENT DOCUMENTS

| | | | | |
|---|---|---|---|---|
| 4,553,775 A | * | 11/1985 | Halling | 285/55 |
| 4,779,901 A | * | 10/1988 | Halling | 285/184 |
| 4,893,656 A | * | 1/1990 | Willhoft | 137/874 |
| 5,149,014 A | * | 9/1992 | Faller | 244/17.19 |
| 5,232,252 A | * | 8/1993 | Bartholomew | 285/108 |
| 5,454,530 A | * | 10/1995 | Rutherford et al. | 244/7 A |
| 5,505,498 A | * | 4/1996 | Halling et al. | 285/111 |
| 5,765,373 A | * | 6/1998 | Bittle et al. | 60/313 |
| 5,765,776 A | * | 6/1998 | Rogers et al. | 244/12.2 |
| 5,984,635 A | * | 11/1999 | Keller | 416/20 A |
| 6,131,849 A | * | 10/2000 | Nyhus | 244/17.11 |
| 6,386,790 B1 | * | 5/2002 | Thiel et al. | 403/335 |
| 6,471,158 B1 | * | 10/2002 | Davis | 244/8 |
| 6,705,483 B2 | * | 3/2004 | Hagano et al. | 220/303 |
| 6,709,023 B2 | * | 3/2004 | French | 285/223 |
| 6,789,764 B2 | * | 9/2004 | Bass et al. | 244/10 |
| 7,163,206 B2 | * | 1/2007 | Cross et al. | 277/399 |
| 7,275,711 B1 | * | 10/2007 | Flanigan | 244/17.11 |
| 7,390,030 B2 | * | 6/2008 | Lamm | 285/321 |
| 7,412,825 B2 | * | 8/2008 | Muylaert | 60/324 |
| 2001/0007324 A1 | * | 7/2001 | Hagano et al. | 220/303 |
| 2005/0218651 A1 | * | 10/2005 | Lamm | 285/321 |
| 2008/0135677 A1 | * | 6/2008 | Oleshchuk et al. | 244/17.11 |

FOREIGN PATENT DOCUMENTS

SU        846326 B   *   7/1981

* cited by examiner

FLEXIBLE DUCTING SYSTEM INCLUDING AN ARTICULABLE SEALED JOINT

This is a divisional of U.S. application Ser. No. 11/434,676 filed May 16, 2006 now U.S. Pat. No. 7,600,711.

This invention was made with government support under an agreement with the U.S. Defense Advanced Research Projects Agency (agreement number MDA972-98-9-0009). The U.S. government has certain rights in this invention.

BACKGROUND OF THE INVENTION

The present invention relates to a flexible ducting system and, more particularly, to a flexible ducting system including an articulable sealed joint.

Sealed ducting systems carry fluids such as high-pressure gas within many conventional assemblies. Sometimes, such ducting systems must be flexible. For example, some ducting systems must be flexible to accommodate movements of parts of the assembly. Some ducting systems require flexibility in a joint thereof. Designing a flexible sealed joint is challenging. The challenge is increased when the ducting system transports high-pressure and high-temperature fluids. For example, limited types of material can be used in ductwork of systems transporting fluids having a temperature above a few hundred degrees centigrade and/or that must be maintained at a pressure above about 20 psi. A robust flexible ducting system including an articulable sealed joint is needed for use in assemblies, especially those transporting high-pressure and high-temperature fluids.

BRIEF SUMMARY OF THE INVENTION

The present invention relates to aircraft including an airframe having a fuselage extending longitudinally between a forward end and an aft end opposite the forward end and a set of fixed wings extending laterally from the fuselage. The aircraft further includes a power plant mounted on the airframe producing exhaust during operation of the aircraft for powering the aircraft. The aircraft also includes a rotor/wing assembly rotatably mounted on the airframe for selective rotation with respect to the airframe. The rotor/wing assembly has a plurality of blades and each blade extends outward from a root adjacent the airframe to a tip opposite the root. Each blade has an internal conduit extending through the blade between an inlet adjacent the root of the blade and an outlet downstream from the inlet. In addition, the aircraft includes a plurality of intermediate ducts. Each intermediate duct has an upstream end including a flange and a downstream end downstream from the upstream end slidably and pivotally connected to the inlet of a corresponding blade of the plurality of blades of the rotor/wing assembly. Moreover, the aircraft includes a manifold having an upstream end in fluid communication with the power plant and a plurality of downstream ends. Each downstream end includes a flange connected to an upstream end of a corresponding intermediate duct of the plurality of intermediate ducts for directing exhaust received by the manifold to the intermediate duct. The aircraft further includes a plurality of covers. Each cover is connected to one of the manifold flanges and covers a corresponding one of the intermediate duct flanges. The aircraft also includes a plurality of absorbers. Each absorber is positioned between one of the intermediate duct flanges and a corresponding one of the manifold flanges and extends between the intermediate duct flange and the cover covering the intermediate duct flange to allow limited movement of the intermediate duct flange with respect to the manifold flange and the cover.

In another aspect, the present invention relates to an assembly including an articulable sealed joint connecting a first duct and a second duct. The first duct has a first flange extending outward adjacent an edge thereof and the second duct has a second flange extending outward therefrom. The assembly includes a cover connected to the first flange of the first duct and covering the second flange of the second duct. The assembly further includes an absorber positioned between the first flange and the second flange and between the second flange and the cover allowing limited movement of the second flange with respect to the first flange and the cover. The assembly also includes a gasket positioned between the first flange and the absorber and between the first flange and the second flange.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
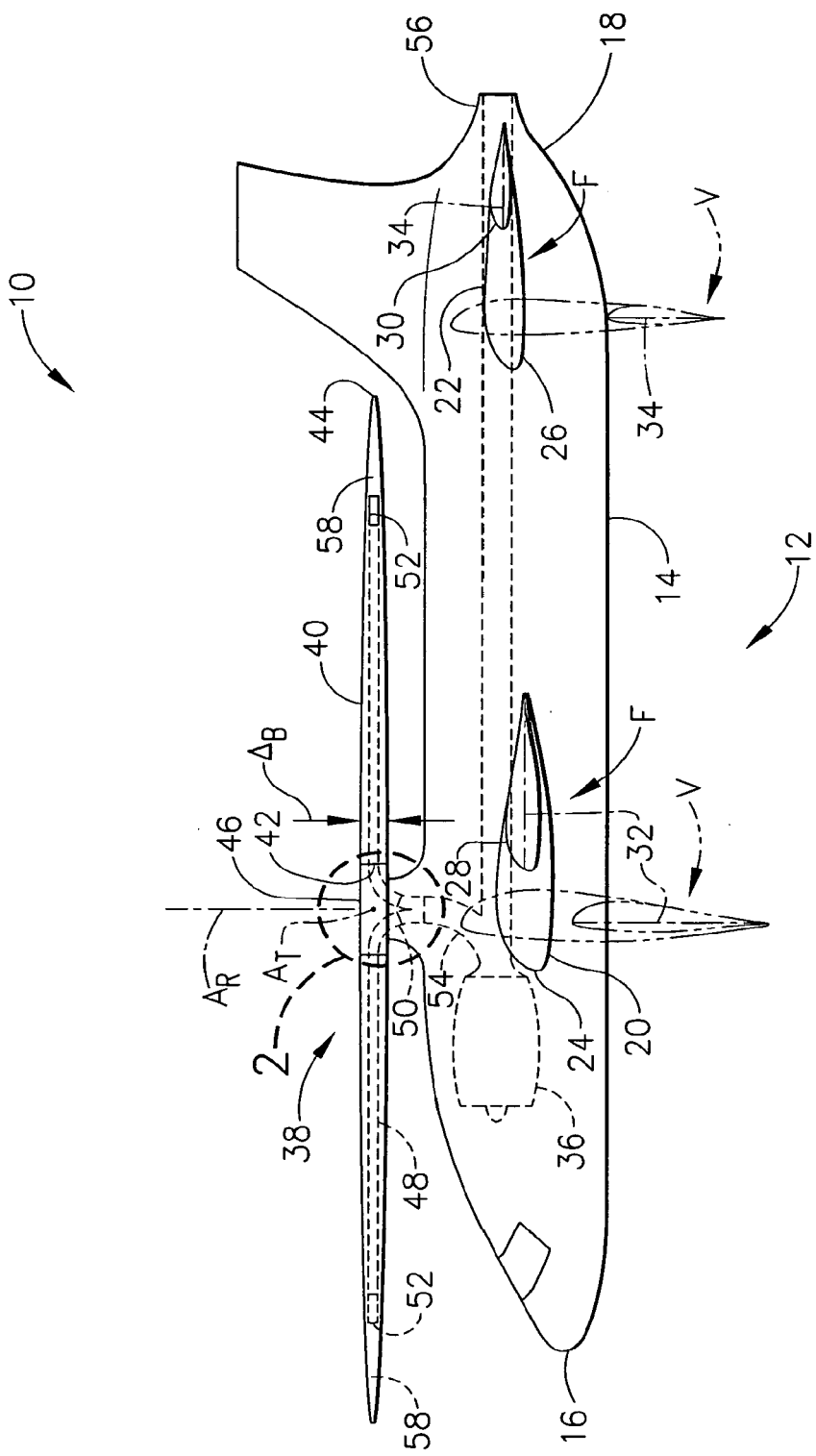
FIG. 1 is a side elevation of an aircraft according to the present invention showing a power plant, a rotor/wing assembly, and a ducting system.

Referring to the figures, and more particularly to FIG. 1, aircraft according to the present invention is designated in its entirety by reference number 10. The aircraft 10 includes an airframe 12 having a fuselage 14 extending longitudinally between a forward end 16 and an aft end 18 opposite the forward end. Although the fuselage 14 may have other lengths measured between its forward end 16 and aft end 18 without departing from the scope of the present invention, in one embodiment the fuselage has a length of between about 15 feet and about 20 feet. The aircraft 10 further includes at least one set of fixed wings 20, 22 extending laterally from bases 24, 26 adjacent the fuselage 14 to tips 28, 30 opposite the bases. The fixed wings 20, 22 may be rotatably connected to the fuselage 14 for rotating between a forward flight position "F" (shown with solid lines) and a vertical flight position "V" (shown with dashed lines). When the fixed wings 20, 22 are in their forward flight position F, a cord 32, 34 of each fixed wing 20, 22 extends generally horizontally and when the fixed wings are in their vertical flight position V, the cords extend generally vertically. In the forward flight position F, the fixed wings 20, 22 provide lift and in the vertical flight position V they minimally interfere with vertical flight. The fixed wings 20, 22 may also be rotated to intermediate flight positions between the forward and vertical flight positions F, V. Although each set of fixed wings 20, 22 may have other wingspans measured between its wingtips 28, 30 without departing from the scope of the present invention, in one embodiment each set of fixed wings has a wingspan of between about 8 feet and about 10 feet.

The aircraft 10 also includes an engine or power plant 36 mounted on the airframe 12. The power plant 36 produces high-pressure fluid, such as high-pressure gas, for powering the aircraft 10. Although the power plant 36 may produce other amounts of power without departing from the scope of the present invention, in one embodiment the power plant produces between about 700 pounds of thrust and about 900 pounds of thrust. Although the aircraft 10 may include other power plants 36 without departing from the scope of the present invention, in one embodiment the power plant is an F112 power plant, available from Williams International, of Walled Lake, Mich.

In addition, the aircraft 10 includes a rotor/wing assembly 38 rotatably mounted on the airframe 12 about a rotating axis "$A_R$" for selective rotation with respect to the airframe. The rotor/wing assembly 38 includes a plurality of blades 40. Each blade 40 extends outward from a root 42 adjacent the airframe 12 to a tip 44 opposite the root. Each blade root 42 is connected to a central hub 46. Although each blade 40 may have other lengths measured between its root 42 and tip 44 without departing from the scope of the present invention, in one embodiment each blade has a length of between about 5 feet and about 7 feet. Each blade 40 includes an internal conduit 48 extending through the blade between an inlet 50 adjacent its root 42 and an outlet 52 downstream from the inlet. Although each blade 40 may have other maximum thicknesses $\Delta_B$ without departing from the scope of the present invention, in one embodiment each blade has a thickness of between about 2 inches and about 6 inches.

The aircraft 10 further includes a ducting system 54 connecting the power plant 36 to an aft nozzle 56 of the aircraft for producing rearward thrust and to the blade inlets 50. During operation of the aircraft 10, exhaust delivered to the blade inlets 50 by the ducting system 54 is channeled through the internal conduits 48 to the blade outlets 52. Each blade outlet 52 is positioned in a trailing side 58 of the corresponding blade 40 so the high-pressure exhaust directed from the outlets propels the rotor/wing assembly 38 thereby producing thrust. Because the rotor/wing assembly 38 rotates in response to the exhaust being directed from its outlets 52, these aircraft 10 are often referred to as reaction-drive aircraft. When the rotor/wing assembly 38 is producing thrust, the fixed wings 20, 22 may be rotated to their vertical flight position V to minimally interfere with downwash from the rotor/wing assembly.

Figure 2:
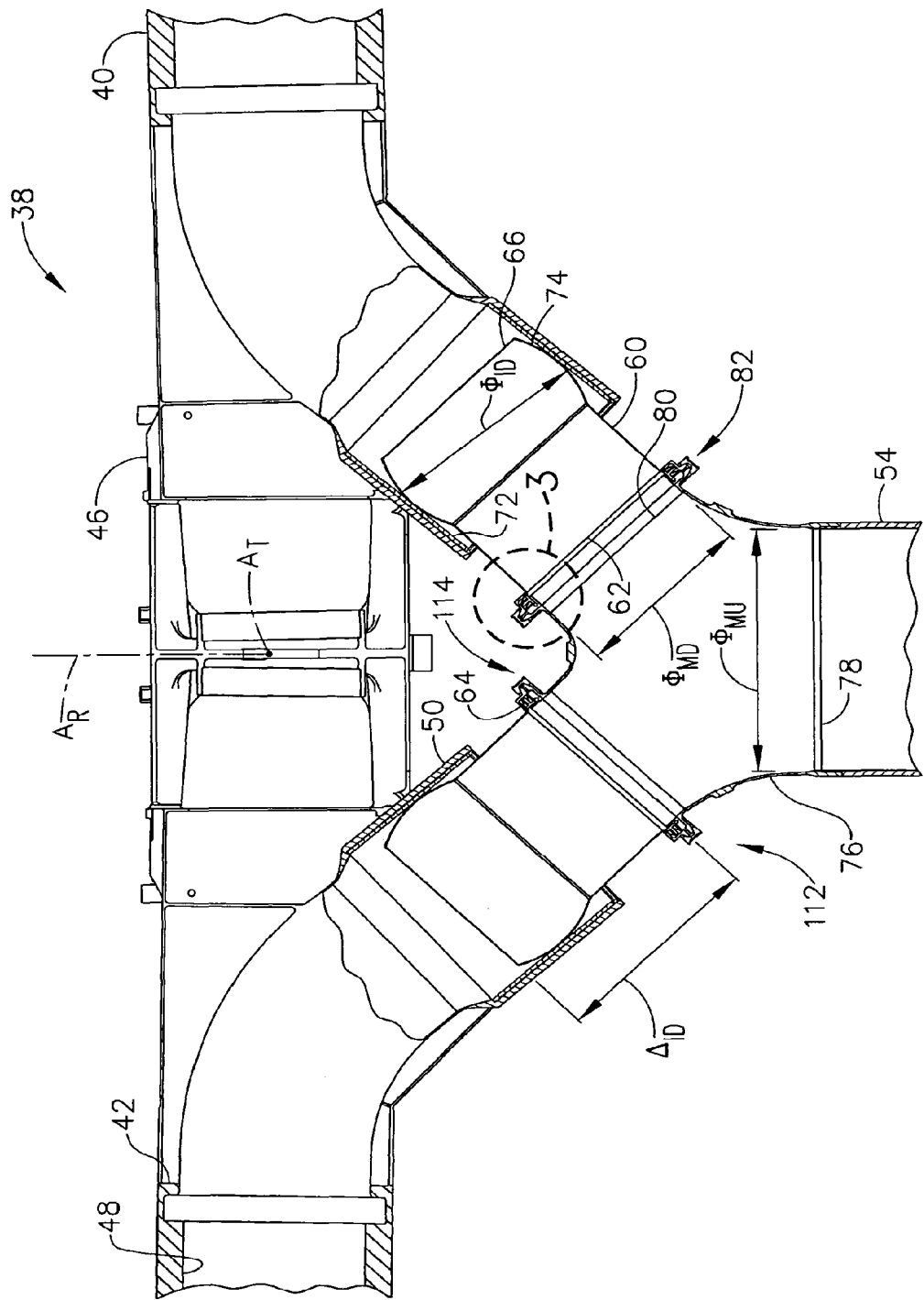
FIG. 2 is an enlarged view of the ducting system and the rotor/wing assembly of FIG. 1 showing the rotor/wing assembly in a default position.
Figure 3:
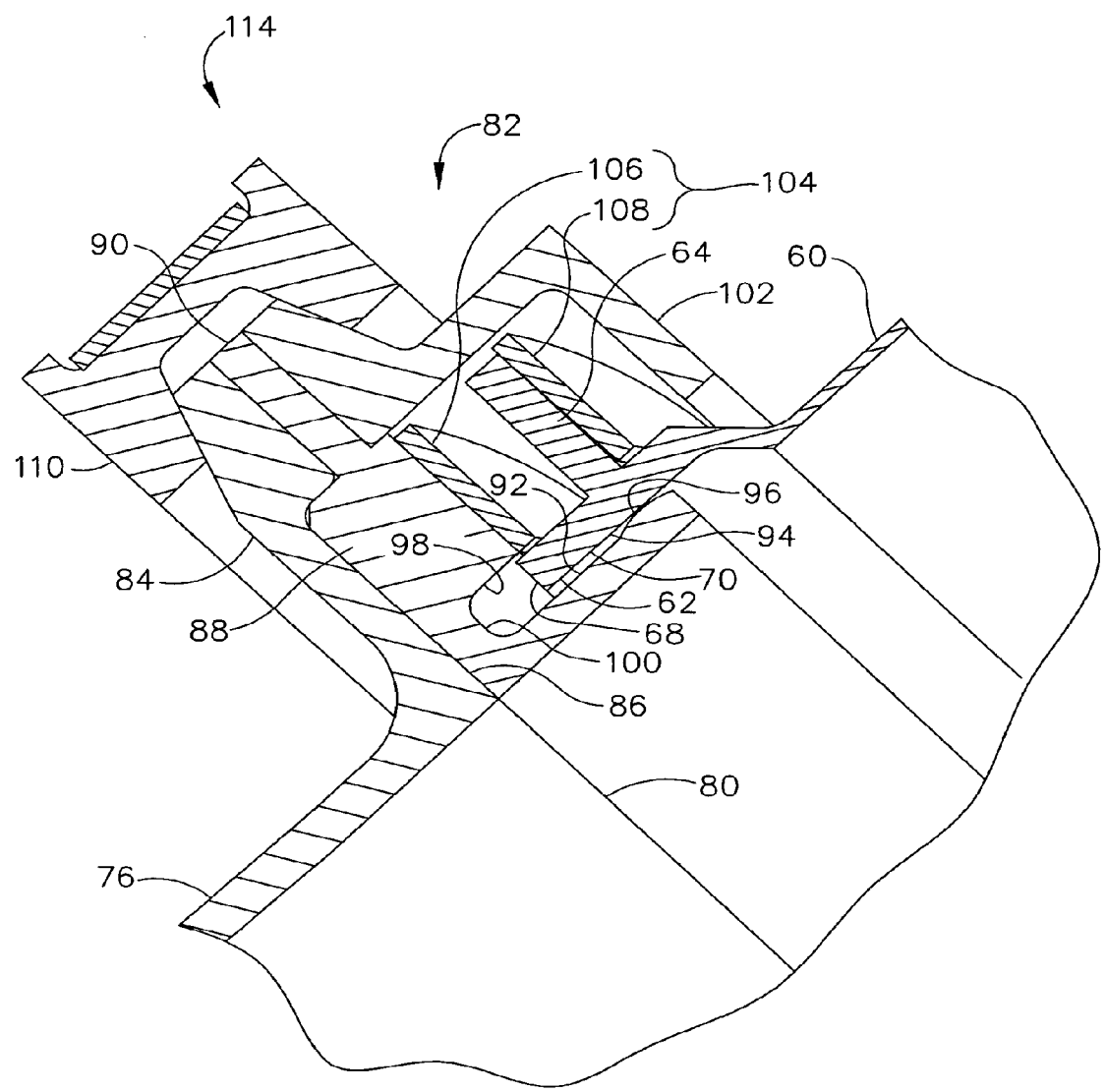
FIG. 3 is an enlarged view of the ducting system of FIG. 2 showing a first side of a sealed joint of the ducting system in a default position.

As shown in FIG. 2, the aircraft 10 includes a plurality of intermediate ducts 60. Each intermediate duct 60 has an upstream end 62 including a flange 64 extending outward therefrom and a downstream end 66 downstream from the upstream end. Although each intermediate duct 60 may have other maximum lengths $\Delta_{ID}$ without departing from the scope of the present invention, in one embodiment each intermediate duct has a maximum length of between about 5 inches and about 7 inches. Although each intermediate duct 60 may have other maximum inner diameters $\Phi_{ID}$ without departing from the scope of the present invention, in one embodiment each intermediate duct has a maximum inner diameter of between about 6 inches and about 8 inches. As shown in FIG. 3, the intermediate duct flange 64 is spaced from an inboard edge 68 of the intermediate duct 60 and the intermediate duct includes a longitudinal rib 70 positioned between the intermediate duct flange and the inboard edge.

The downstream end 66 of the intermediate duct 60 is slidably and pivotally connected to the inlet 50 of a corresponding blade 40 of the rotor/wing assembly 38. For example, as shown in FIG. 2, the downstream end 66 of the intermediate duct 60 may be positioned inside the blade inlet 50 adjacent an inner surface 72 of the blade inlet so the inner surface of the blade inlet slides and pivots with respect to an outer surface 74 of the downstream end of the intermediate duct during operation of the rotor/wing assembly 38. The outer surface 74 of the downstream end 66 of the intermediate duct 60 is shaped and sized to maintain a sealed connection between the intermediate duct and the blade inlet 50 while allowing the downstream end to slide and pivot with respect to the inlet. Although the outer surface 74 of the downstream end 66 may have other shapes without departing from the scope of the present invention, in one embodiment the surface has a semi-toroidal shape, as shown in FIG. 2. In one embodiment, the outer surface 74 of the downstream end 66 of the intermediate duct 60 has a semi-spherical shape. The blade inlet 50 and intermediate duct 60 are made of strong materials that resist galling or grinding when they move against each other.

Although the intermediate duct 60 and blade inlet 50 may include other materials without departing from the scope of the present invention, in one embodiment the intermediate duct includes carbon and the blade inlet includes metal. In another embodiment, the intermediate duct 60 includes metal and the blade inlet 50 includes carbon. To reduce galling between the intermediate duct 60 and the blade inlet 50, the outer surface 74 of the downstream end 66 of the intermediate duct 60 and/or the inner surface 72 of the blade inlet may have a generally gall resistant coating (not shown in detail). For example, in one embodiment, the intermediate duct 60 and the blade inlet 50 are made of metal and at least one of the outer surface 74 of the downstream end 66 and the inner surface 72 of the blade inlet 50 are coated to reduce galling between them. In a particular embodiment, the intermediate duct 60 and the blade inlet 50 are made of metal, the outer surface 74 of the downstream end 66 of the intermediate duct is coated with carbon, and the inner surface 72 of the blade inlet is uncoated. In another particular embodiment, the intermediate ducts 60 and the blade inlet 50 are made of metal, the inner surface 72 of the blade inlet is coated with carbon, and the outer surface 74 of the downstream end 66 of the intermediate duct is uncoated.

The aircraft 10 further includes a manifold 76 having an upstream end 78 in fluid communication with the power plant 36 and a plurality of downstream ends 80. Each downstream end 80 of the manifold 76 is connected to the upstream end 62 of a corresponding intermediate duct 60 by a sealed articulable joint 82. The manifold 76 and intermediate duct 60 are rotatable about the rotation axis $A_R$ with the rotor/wing assembly 38 so the manifold, intermediate duct, and rotor/wing assembly rotate together during operation of the rotor/wing assembly. Each downstream end 80 of the manifold 76 includes a flange 84 extending outward adjacent an edge 86 thereof connected to the upstream end 62 of the corresponding intermediate duct 60 for directing exhaust received by the manifold to the intermediate duct. Each of the intermediate ducts 60 is slidable and pivotable with respect to the manifold 76 during operation of the aircraft 10. Although the manifold 76 may include other materials without departing from the scope of the present invention, in one embodiment the manifold includes metal. Although the manifold 76 may have other minimum inner diameters $\Phi_{MU}$ adjacent its upstream end 78 without departing from the scope of the present invention, in one embodiment the manifold has a minimum inner diameter adjacent its upstream end of between about 6 inches and about 8 inches. Although the manifold 76 may have other minimum inner diameters $\Phi_{MD}$ adjacent its downstream ends 80 without departing from the scope of the present invention, in one embodiment the manifold has a minimum inner diameter adjacent each downstream end of between about 4 inches and about 8 inches.

The articulable sealed joint 82 includes a plurality of gaskets 88. Each gasket 88 is positioned between one of the manifold flanges 84 and a corresponding intermediate duct flange 64. Each gasket 88 may include an extension 90 extending outward. The gasket 88 has a lateral surface 92 and the intermediate duct 60 has an inner surface 94 opposite the lateral surface. The gasket 88 and intermediate duct 60 may be sized and shaped to improve a seal between them thereby reducing a potential for exhaust (not shown) to pass between the gasket and the intermediate duct during operation of the aircraft 10. For example, in one embodiment, shown in FIG. 3, the gasket 88 includes a protrusion 96 extending from its lateral surface 92 toward the inner surface 94 of the intermediate duct 60 to improve a seal between them. Each gasket 88 includes a slot 98 for receiving the longitudinal rib 70 of the intermediate duct 60. As shown in FIG. 3, the longitudinal rib 70 is spaced from a bottom 100 of the slot 98 when the intermediate duct 60 is in a default position with respect to the manifold 76. When the intermediate duct 60 is in its default position with respect to the manifold 76, the articulable sealed joint 82 is in its default position. Although the gaskets 88 may include other materials without departing from the scope of the present invention, in one embodiment each gasket includes metal.

As shown in FIG. 3, each articulable sealed joint 82 further includes a cover 102. Each cover 102 is connected to one of the manifold flanges 84 and covers a corresponding one of the intermediate duct flanges 64. Although the covers 102 may include other materials without departing from the scope of the present invention, in one embodiment the cover includes metal. The gasket extension 90 extends between the corresponding cover 102 and manifold flange 84.

Each articulable sealed joint 82 also includes an absorber 104, shown in FIG. 3. Each absorber 104 is positioned between one of the intermediate duct flanges 64 and the corresponding manifold flange 84 and extends between the intermediate duct flange and the corresponding cover 102 to allow limited movement of the intermediate duct flange with respect to the manifold flange and the cover. As shown in FIG. 3, in embodiments of the aircraft 10 including the gasket 88, the absorber 104 may be positioned between the intermediate duct flange 64 and the gasket. Although the absorber 104 may include other materials without departing from the present invention, in one embodiment each absorber includes an elastomeric material such as rubber. In another embodiment, each absorber 104 includes metal. Various types of absorbers 104 may be used without departing from the scope of the present invention. FIG. 3 shows the absorber 104 including an inboard wave spring 106 positioned between the intermediate duct flange 64 and the manifold flange 84 and an outboard wave spring 108 positioned between the intermediate duct flange and the cover 102. Although the wave springs may be made of other materials without departing from the scope of the present invention, in one embodiment the wave springs are made of metal. In one embodiment, the absorber 104 includes the intermediate duct flange 64.

Each articulable sealed joint 82 further includes a connector 110 connecting the corresponding cover 102 to the corresponding manifold flange 84. Although the aircraft 10 may include other types of connectors 110 without departing from the scope of the present invention, in one embodiment each connector is a clamp. In a particular embodiment, the connector 110 is a v-band clamp.

Figure 4:
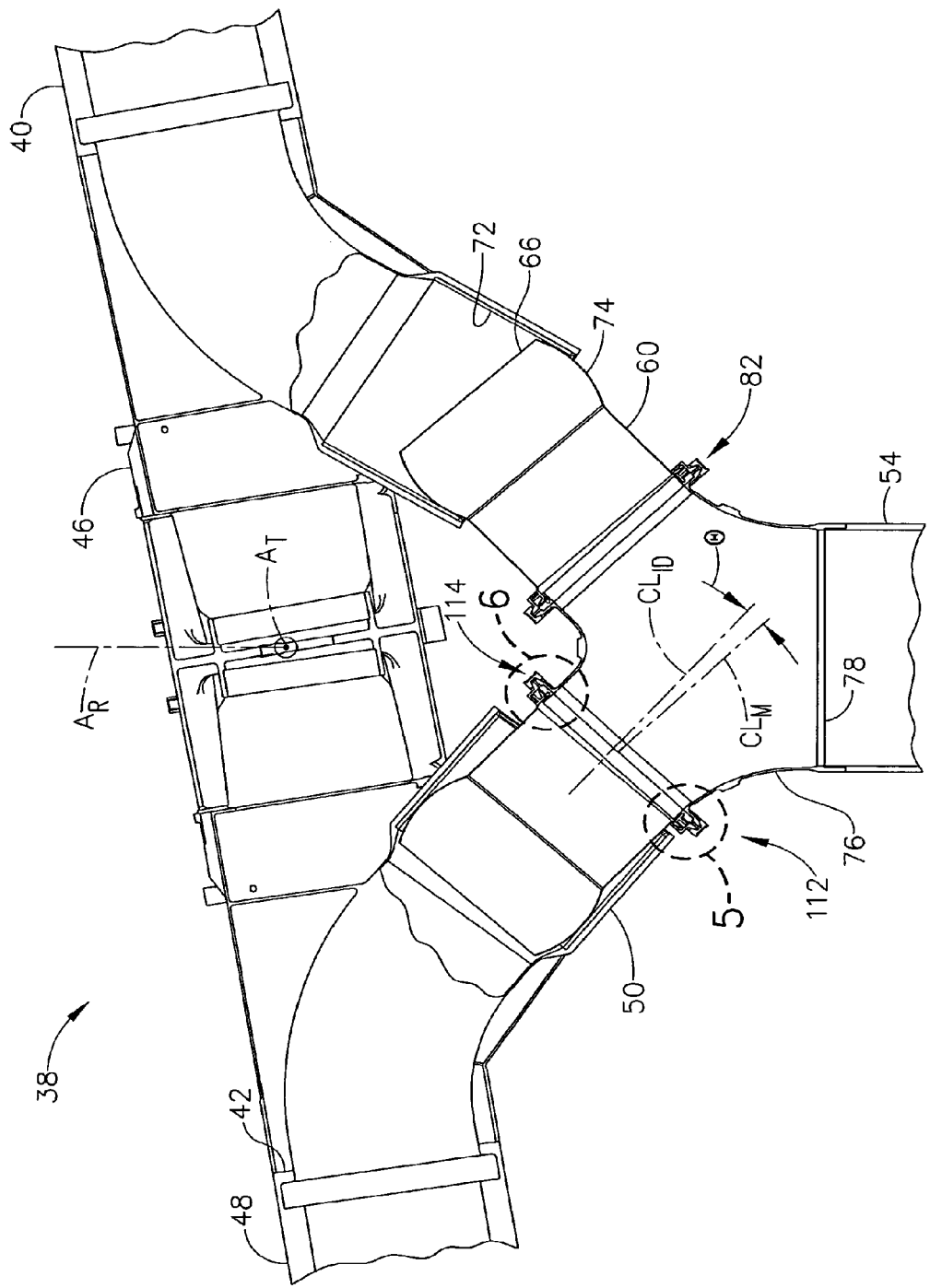
FIG. 4 is an enlarged view of the ducting system and rotor/wing assembly of FIG. 1 showing the rotor/wing assembly in a rotated position and the sealed joint in a pivoted position.

The rotor/wing assembly 38 is rotatable about a teetering axis $A_T$ (shown perpendicular to view in FIG. 2) for controlling a direction of thrust provided by the rotor/wing assembly when it rotates about the rotating axis $A_R$. For example, the rotor/wing assembly 38 may be teetered about its teetering axis $A_T$ so that, when the blades 40 rotate about their axis $A_R$, the blade tips 44 are lower when they are closer to the forward end 16 of the fuselage 14 and higher when they are closer to the aft end 18 of the fuselage for providing thrust propelling the aircraft 10 upward and forward. As another example, the rotor/wing assembly 38 may be teetered about its teetering axis $A_T$ so that, when the blades 40 rotate about their axis $A_R$, the blade tips 44 are higher when they are closer to the forward end 16 of the fuselage 14 and lower when they are closer to the aft end 18 of the fuselage for providing thrust propelling the aircraft 10 upward and rearward. FIG. 2 shows the rotor/wing assembly 38 in a default position and FIG. 4 shows the assembly fully teetered in one direction. The assembly 38 can be fully teetered in a direction opposite from that shown in FIG. 4 and to a plurality of intermediate positions between the default and fully teetered positions.

When the rotor/wing assembly 38 is moved between its default and fully teetered positions, the blade inlet 50 slides and pivots with respect to the downstream end 66 of the intermediate duct 60 as can be seen by comparing FIGS. 2 and 4. As discussed above, the downstream end 66 of the intermediate duct 60 and the blade inlet 50 are sized and shaped to allow such relative motion while maintaining a seal between them. As described above, each articulable sealed joint 82 allows limited relative movement between the corresponding intermediate duct 60 and manifold 76. The ability of the intermediate ducts 60 to move with respect to the manifold 76 gives each blade inlet 50 a greater range of motion with respect to the corresponding intermediate duct.

Figure 5:
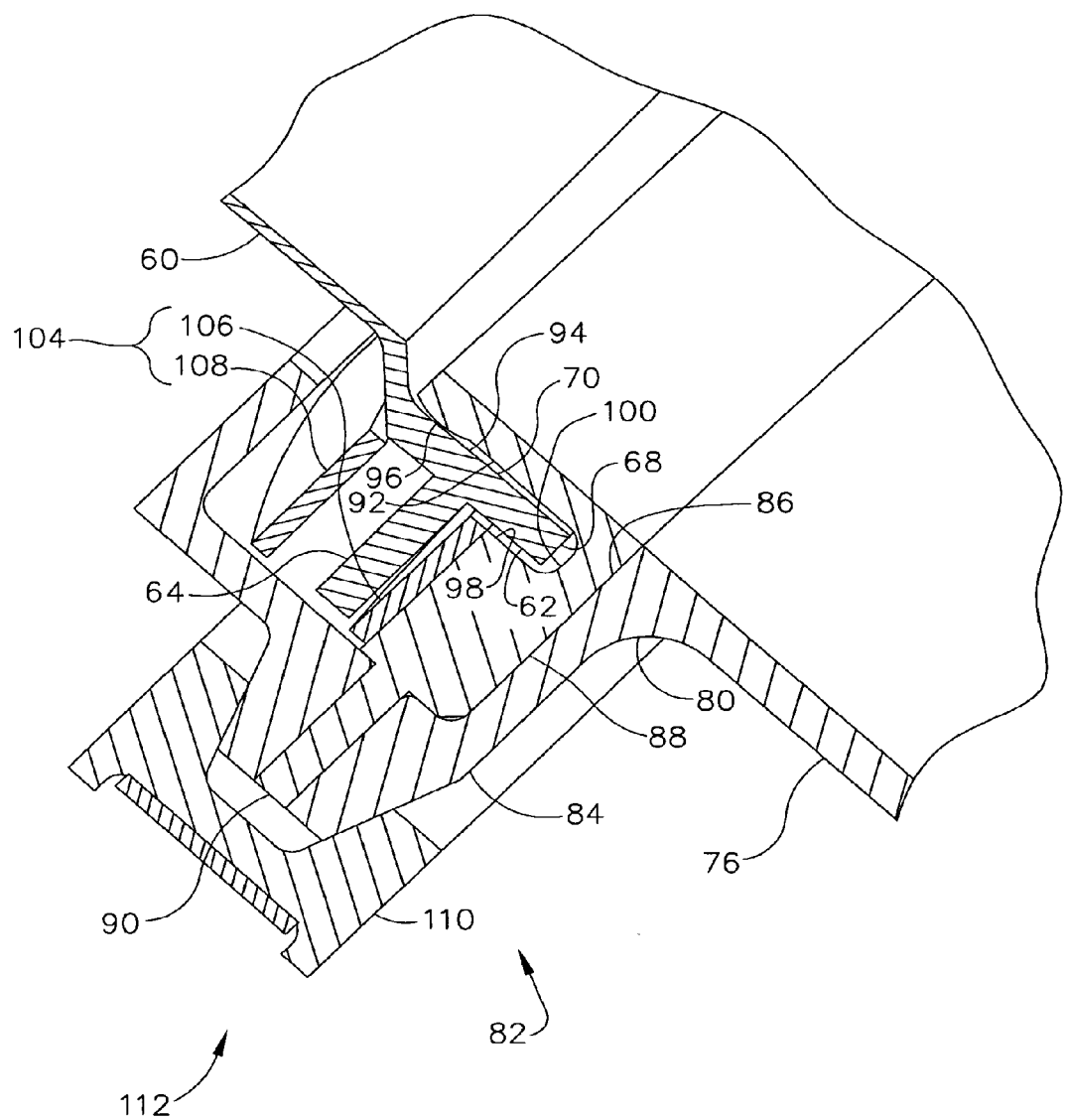
FIG. 5 is an enlarged view of the ducting system of FIG. 4 showing the first side of the sealed joint in the pivoted position.
Figure 6:
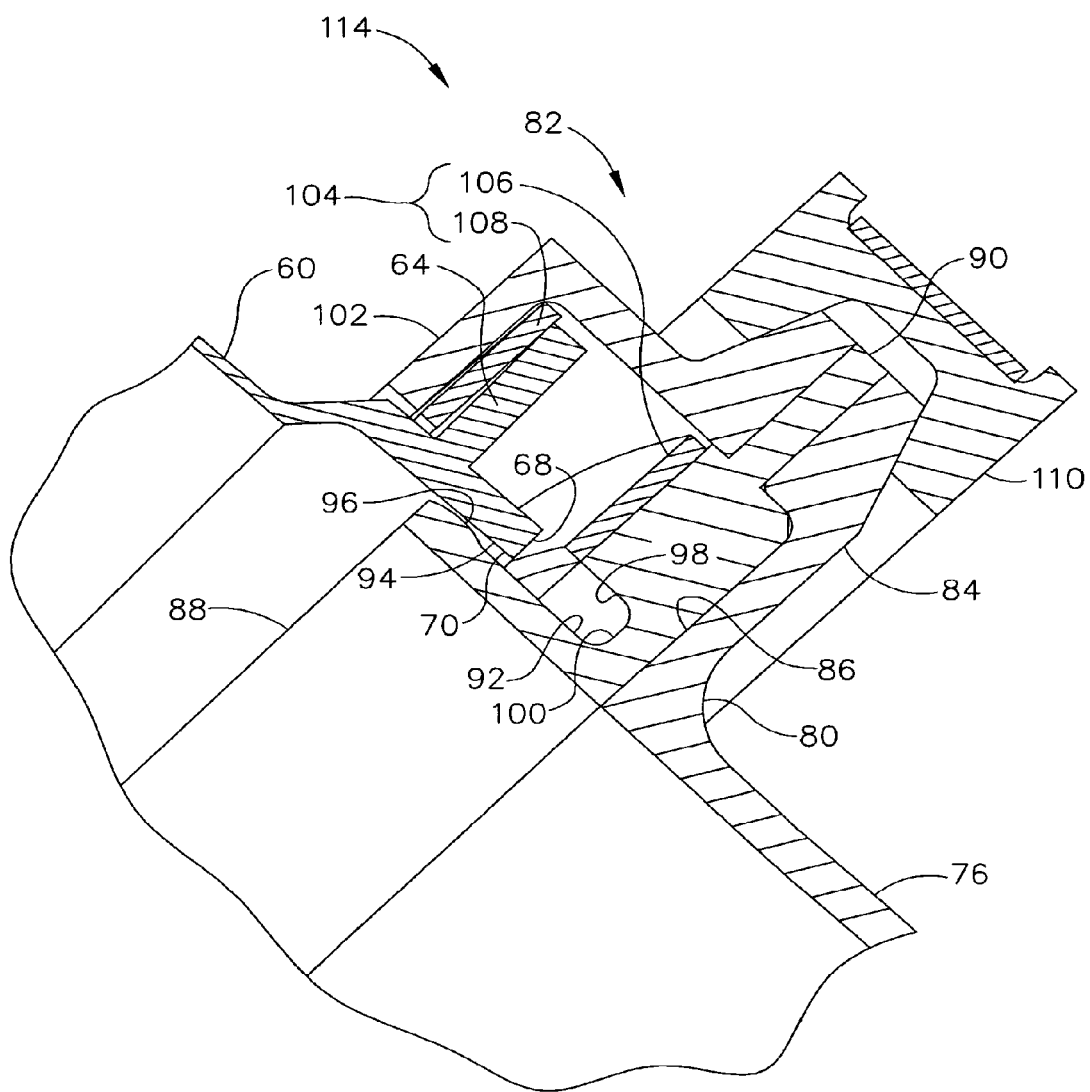
FIG. 6 is an enlarged view of the ducting system of FIG. 4 showing a second side of the sealed joint in the pivoted position.

When the rotor/wing assembly 38 is in its default position, the intermediate duct 60 and articulable sealed joint 82 are in their respective default positions, as shown in FIG. 3. When the rotor/wing assembly 38 teeters about its teetering axis $A_T$ toward one of its fully teetered positions, the intermediate duct 60 pivots with respect to the manifold 76 to a pivoted position. As shown in FIGS. 4 and 5, a first side 112 of each articulable sealed joint 82 contracts to allow the intermediate duct 60 to assume its fully pivoted position. As shown in FIGS. 4 and 6, a second side 114 of each articulable sealed joint 82 opposite the first side 112 extends to allow the intermediate duct 60 to assume its fully pivoted position. The intermediate duct 60 may be pivoted to a plurality of pivoted positions between the default position and both fully pivoted positions. As the intermediate duct 60 moves toward one of its fully pivoted positions, as shown in FIG. 4, the intermediate duct flange 64 moves toward the corresponding upstream end 78 of the manifold 76 on the first side 112 of the articulable sealed joint 82. As the intermediate duct 60 moves toward one of its fully pivoted positions, as shown in FIG. 4, the intermediate duct flange 64 moves toward the corresponding cover 102 on the second side 114 of the articulable sealed joint 82. Movement of the intermediate duct 60 from its default position separates a longitudinal centerline $CL_{ID}$ of the intermediate duct and a longitudinal centerline $CL_M$ of the corresponding downstream end 80 of the manifold 76. Although the centerline $CL_{ID}$ of the intermediate duct 60 and the centerline $CL_M$ of the corresponding downstream end 80 of the manifold 76 may be separated by other angles $\theta$ when the intermediate duct and articulable sealed joint 82 are in their fully pivoted positions (shown in FIGS. 4, 5, and 6) without departing from the scope of the present invention, in one embodiment the centerline $CL_{ID}$ of the intermediate duct 60 and the centerline $CL_M$ of the corresponding downstream end 80 of the manifold 76 are separated by an angle of between about 1° and about 3° when the intermediate duct and the articulable sealed joint are in their fully pivoted positions. Greater separation between the centerline $CL_{ID}$ of the intermediate duct 60 and the centerline $CL_M$ of the corresponding downstream end 80 of the manifold 76 allows the blade inlet 50 to slide and pivot more with respect to the downstream end 66 of the intermediate duct 60. In this way, the articulable sealed joint 82 gives the rotor/wing assembly 38 greater freedom to rotate about the teetering axis $A_T$.

As described earlier, each absorber 104 allows the corresponding intermediate duct flange 64 to move with respect to each corresponding manifold flange 84 and the corresponding cover 102. The absorber 104 cushions the movement between the intermediate duct flange 64 and each corresponding manifold flange 84 and cover 102 and ensures the intermediate duct 60 returns to its default position when the rotor/wing assembly 38 is in its default position. When the intermediate duct flange 64 moves toward the manifold flange 84 on one side 112, 114 of the articulable sealed joint as shown in FIG. 5, the longitudinal rib 70 of the intermediate duct 60 moves toward the bottom 100 of the gasket slot 98 on that side. When the intermediate duct flange 64 moves toward the cover 102 on the other side 114, 112 as shown in FIG. 6, the longitudinal rib 70 moves away from the bottom 100 of the slot 98 on that side.

Although the articulable sealed joint 82 and the slidable and pivotable connection between the intermediate duct 60 and the blade inlet 50 are described as part of aircraft 10, the joint and/or the slidable and pivotable connection may be used in other assemblies (not shown) requiring relative motion between adjacent fluid transporting ducts without departing from the scope of the present invention. Exemplary assemblies include helicopters, automobiles, boats, and manufacturing equipment.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An assembly comprising:
    a first duct terminating in a first annular flange;
    a second duct terminating in a second annular flange; and
    an articulable sealed joint including:
        a cover covering said second flange of the second duct, the cover terminating in a third flange that extends outwards and opposes the first flange of the first duct;
        a first absorber positioned between said second flange and said cover;
        a second absorber positioned on an opposite side of the second flange; and
        a gasket between the first flange and the second absorber;
        the first and second absorbers allowing limited movement of said second flange with respect to the first flange and the cover.

2. An assembly as set forth in claim 1 wherein the second absorber includes a wave spring positioned between said gasket and said second flange and wherein the first absorber includes a wave spring positioned between said second flange and said cover.

3. An assembly as set forth in claim 1 wherein the gasket has a lateral surface and the second duct has an inner surface opposite said lateral surface and the gasket includes a protrusion extending from its lateral surface, the protrusion between the first and third flange.

4. The assembly of claim 1, wherein each absorber is made of an elastomeric material.

5. The assembly of claim 1, wherein a downstream end of the second duct includes a toroidal or spherical portion.

6. The assembly of claim 1, further comprising a clamp for connecting the cover to the first flange.

7. An assembly including an articulable sealed joint connecting a first duct having a first flange extending outward adjacent an edge thereof and a second duct having a second flange extending outward therefrom, the assembly comprising
    a cover connected to said first flange of the first duct and covering said second flange of the second duct;
    an absorber positioned between said first flange and said second flange and between said second flange and said cover allowing limited movement of said second flange with respect to the first flange and the cover; and
    a gasket positioned between said first flange and said absorber and between said first flange and said second flange;
    wherein said second flange is spaced from said edge of the second duct, the second duct includes a longitudinal rib positioned between said second flange and said edge, and the gasket includes a slot in which the longitudinal rib is positioned to pilot the second duct in the sealed joint.

8. An assembly as set forth in claim 7 wherein the second duct is pivotable between a default position and a plurality of pivoted positions and said longitudinal rib is spaced from a bottom of said slot when the second duct is in its default position.

9. An assembly comprising:
    a manifold having an upstream end and a plurality of downstream ends, each downstream end having a first annular flange;
    a plurality of ducts, each duct having upstream end with a second annular flange;
    and a plurality of articulable joints, each jointing connecting an upstream end of a corresponding duct to a corresponding downstream end of the manifold, each joint having a first side that contracts and an opposing second side that expands to allow the corresponding duct to assume a fully pivoted position; each articulable joint including:
        a cover terminating in a third annular flange that extends outwards and opposes the first flange of the corresponding manifold downstream end, the cover covering the second flange of the corresponding duct;
        a first absorber positioned between the second flange and the cover; and
        a second absorber positioned between the corresponding first and second flanges to cushion movement between the corresponding duct upstream end and manifold downstream end.

10. The assembly of claim 9 wherein each articulable joint further includes a gasket having a first portion between the corresponding first flange and the second absorber, and a second portion between the first and third flanges.

11. The assembly of claim 9, wherein each first absorber includes an inboard wave spring positioned between the corresponding first and second flanges; and each second absorber includes an outboard wave spring positioned between the cover and the corresponding second flange.

* * * * *